United States Patent
Nakaizawa

(10) Patent No.: US 10,416,870 B2
(45) Date of Patent: Sep. 17, 2019

(54) DISPLAY CONTROL DEVICE AND NON-TRANSITORY COMPUTER-READABLE STORAGE MEDIUM HAVING PROGRAM RECORDED THEREON

(71) Applicant: KYOCERA Document Solutions Inc., Osaka (JP)

(72) Inventor: Tomoaki Nakaizawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 244 days.

(21) Appl. No.: 15/443,099

(22) Filed: Feb. 27, 2017

(65) Prior Publication Data
US 2017/0255377 A1    Sep. 7, 2017

(30) Foreign Application Priority Data
Mar. 2, 2016   (JP) .................................. 2016-040115

(51) Int. Cl.
  *G06F 3/0484*   (2013.01)
  *G06F 3/0485*   (2013.01)
  *G06F 3/0488*   (2013.01)

(52) U.S. Cl.
  CPC ...... *G06F 3/04855* (2013.01); *G06F 3/04883* (2013.01); *G06F 2203/04808* (2013.01)

(58) Field of Classification Search
  CPC .. G06F 3/04855; G06F 3/0412; G06F 3/0416; G06F 3/04883; G06F 2203/04808

(Continued)

(56) References Cited

U.S. PATENT DOCUMENTS 9,436,373 B2   9/2016 Fukuda et al.
2014/0009415 A1*  1/2014 Nishida .............. G06F 3/04886
                                                            345/173

(Continued)

FOREIGN PATENT DOCUMENTS

JP    H10-161628 A    6/1998
WO    2014/083929 A1  6/2014

OTHER PUBLICATIONS

An Office Action; "Notification of Reasons for Refusal," issued by the Japanese Patent Office dated Sep. 18, 2018, which corresponds to Japanese Patent Application No. 2016-040115 and is related to U.S. Appl. No. 15/443,099; with English language translation.

*Primary Examiner* — Scott T Baderman
*Assistant Examiner* — Hassan Mrabi
(74) *Attorney, Agent, or Firm* — Studebaker & Brackett PC

(57) ABSTRACT

A display control device includes a display, a touch panel, and a display controller. The touch panel is attached to the display. The display controller controls the display based on an operation performed on the touch panel. The display controller determines whether or not the touch panel has detected a tool display operation performed when the display displays a partial image of an entire image. Upon determining that the touch panel has detected the tool display operation, the display controller controls the display to display a move operation tool. The display controller determines whether or not the touch panel has detected a move operation. Upon determining that the touch panel has detected the move operation, the display controller controls the display to display a different partial image of the entire image based on the move operation.

12 Claims, 8 Drawing Sheets

(58) Field of Classification Search
USPC .......................................................... 715/787
See application file for complete search history.

(56) References Cited

U.S. PATENT DOCUMENTS

| | | | |
|---|---|---|---|
| 2014/0157181 A1 | 6/2014 | Fukuda et al. | |
| 2014/0173532 A1* | 6/2014 | Ikeda .................... | G06F 3/0485 715/863 |
| 2015/0177860 A1* | 6/2015 | Imai ...................... | G06F 3/0486 345/173 |
| 2016/0004404 A1* | 1/2016 | Takase .................. | G06F 3/0485 345/648 |
| 2016/0063674 A1* | 3/2016 | Karoji ................... | G05B 15/02 345/665 |
| 2016/0162143 A1* | 6/2016 | Ito ......................... | G06F 3/0485 345/173 |
| 2016/0299606 A1* | 10/2016 | Go ......................... | G06F 3/046 |
| 2016/0342324 A1 | 11/2016 | Fukuda et al. | |
| 2017/0060378 A1* | 3/2017 | Hartman ............... | G06F 3/0486 |

\* cited by examiner

DISPLAY CONTROL DEVICE AND NON-TRANSITORY COMPUTER-READABLE STORAGE MEDIUM HAVING PROGRAM RECORDED THEREON

INCORPORATION BY REFERENCE

The present application claims priority under 35 U.S.C. § 119 to Japanese Patent Application No. 2016-040115, filed on Mar. 2, 2016. The contents of this application are incorporated herein by reference in their entirety.

BACKGROUND

The present disclosure relates to a display control device and a non-transitory computer-readable storage medium having a program recorded thereon.

Displays capable of displaying images as variable are in widespread use. The displays are for example mounted in mobile phones, tablet computers, portable gaming devices, or the like. The displays are also mounted in CD players, DVD players, and various electronic devices as a part thereof.

A display may not be able to display an entire image on a screen at once due to screen size constraints, text size constraints, and the like. In such a situation, a user can move the displayed image within die screen using an operation section. For example, the user can move the image using a mouse or a keyboard.

In recent years, touch panels have been widely used as operation sections of displays. Upon a user operating a touch panel of a display, the touch panel detects the user's operation, and the display changes an image in accordance with the user's operation.

For example, a scrolling control device is known that enables momentum scrolling of a screen. In a situation in which a user performs scrolling by changing a coordinate position of the user's touch and stops the scrolling at some point, the scrolling control device causes a display to display the screen with the scrolling automatically continuing at the same speed as the speed at the time of stopping the scrolling.

SUMMARY

A display control device according to the present disclosure includes a display, a touch panel, and a display controller having a processor and a storage section storing therein a control program. The touch panel is attached to the display. Through the processor executing the control program, the display controller controls the display based on an operation performed on the touch panel. The display controller determines whether or not the touch panel has detected a tool display operation performed when the display displays a partial image of an entire image. Upon determining that the touch panel has detected the tool display operation, the display controller controls the display to display a move operation tool. The display controller determines whether or not the touch panel has detected a move operation performed through operation of the move operation tool. Upon determining that the touch panel has detected the move operation performed through operation of the move operation tool, the display controller controls the display to display a different partial image of the entire image based on the move operation.

A non-transitory computer-readable storage medium according to the present disclosure has a program recorded thereon. The program causes a computer to perform: (1) controlling a display to display a partial image of an entire image; (2) determining whether or not a touch panel attached to the display has detected a tool display operation; (3) controlling, upon determining that the touch panel has detected the tool display operation, the display to display a move operation tool based on the tool display operation; (4) determining whether or not the touch panel has detected a move operation performed through operation of the move operation tool; and (5) controlling, upon determining that the touch panel has detected the move operation, the display to display a different partial image of the entire image based on the move operation.

BRIEF DESCRIPTION OF THE DRAWINGS

FIG. 4A is a schematic diagram illustrating a display before a tool display operation is performed. FIG. 4B is a schematic diagram illustrating the tool display operation that is performed on a touch panel by a user. FIG. 4C is a schematic diagram illustrating the display after the tool display operation. FIG. 4D is a schematic diagram illustrating a move operation that is performed on the touch panel. FIG. 4E is a schematic diagram illustrating the display after the move operation.

FIG. 6A is a schematic diagram illustrating the tool display operation that is performed on the touch panel. FIG. 6B is a schematic diagram illustrating a result of detection by the touch panel. FIG. 6C is a schematic diagram illustrating a move operation tool displayed by the display.

DETAILED DESCRIPTION

The following describes a display control device and a program according to an embodiment of the present disclosure with reference to the drawings. However, the present disclosure is not limited to the following embodiment.

First, a configuration and operation of a display control device 100 according to the present embodiment will be described with reference to FIGS. 1 and 2. The display control device 100 is for example used as a part of a smartphone, a tablet computer, or a personal computer.

Figure 1:
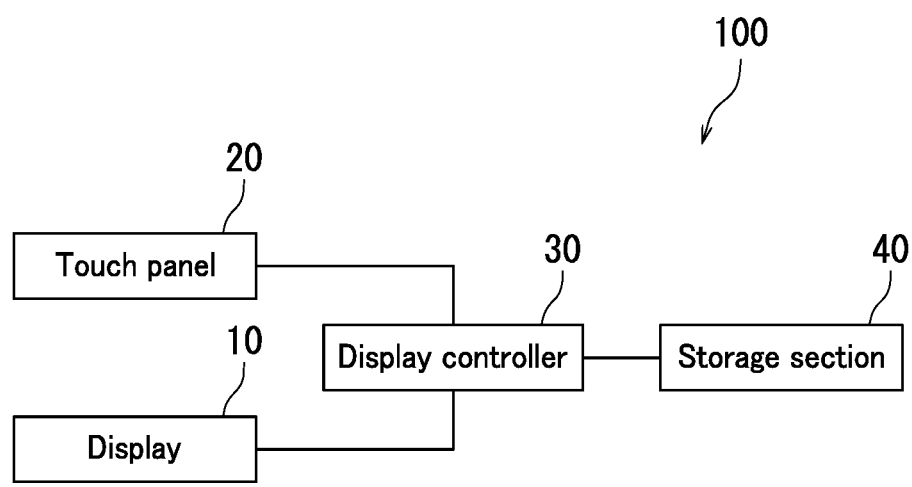
FIG. 1 is a schematic diagram illustrating a display control device according to an embodiment of the present disclosure.

FIG. 1 is a schematic diagram of the display control device 100. The display control device 100 includes a display 10, a touch panel 20, and a display controller 30.

The display 10 displays an image. The display 10 for example displays any image on a screen thereof. Typically, the display 10 has two main surfaces and four side surfaces. The screen of the display 10 is located on one of the two main surfaces. The display 10 may be a liquid crystal display or an organic electroluminescence (EL) display.

The touch panel 20 is attached to the display 10. The touch panel 20 detects a user's operation. The touch panel 20 may be integral with the display 10. Alternatively, the touch panel 20 may be detachable from the display 10.

Typically, the touch panel 20 has two main surfaces and four side surfaces. The touch panel 20 has a transparent region from one of the two main surfaces to the other. The transparent region of the touch panel 20 is disposed over the screen of the display 10. A user of the display control device 100 can visually recognize what is displayed by the display 10 through the touch panel 20.

The user of the display control device 100 operates the touch panel 20. Typically, the user operates the touch panel 20 with a finger thereof. Typically, the user operates the touch panel 20 at a position on the screen of the display 10. Upon the user operating the touch panel 20, the touch panel 20 detects the user's operation.

For example, upon the user operating the touch panel 20, the touch panel 20 detects a position of the user's operation. For a more specific example, upon the user touching the touch panel 20, the touch panel 20 detects a position of the user's touch. In a situation in which the user touches a plurality of positions on the touch panel 20, the touch panel 20 detects the plurality of positions of the user's touches.

The display controller 30 controls the display 10. For example, the display controller 30 changes images that are displayed by the display 10 based on a result of detection by the touch panel 20. The display controller 30 for example includes a central processing unit or an application specific integrated circuit (ASIC).

As illustrated in FIG. 1, the display control device 100 preferably further includes a storage section 40. The storage section 40 stores therein images that are displayed by the display 10. The storage section 40 may store therein a program for controlling operation of the display controller 30.

The storage section 40 for example includes a hard disk, read only memory (ROM), or random access memory (RAM). The ROM is for example programmable ROM (PROM) such as flash memory. The RAM is for example dynamic RAM (DRAM).

However, the display control device 100 does not need to include the storage section 40. The program for controlling either or both of the display controller 30 and images that are displayed by the display 10 may for example be read out of a storage device external to the display control device 100 through a communication section.

Figure 2:
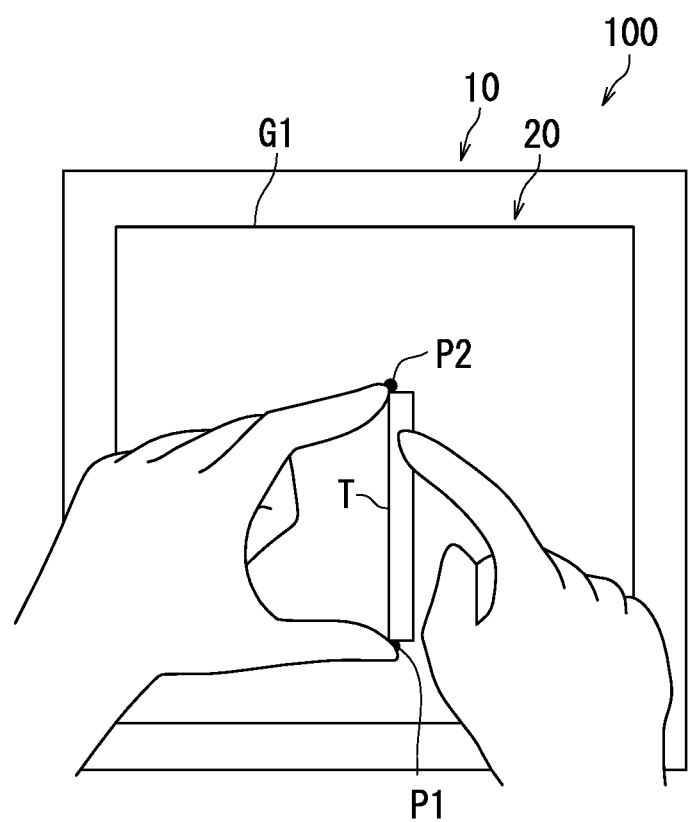
FIG. 2 is a schematic diagram illustrating operation of the display control device according to the embodiment of the present disclosure.

FIG. 2 is a schematic diagram illustrating operation of the display control device 100 according to the present embodiment. The display 10 in the display control device 100 according to the present embodiment displays a partial image of an entire image.

The display 10 may be capable of displaying the entire image. Typically, the entire image includes so many pieces of information (for example, text information) that each piece of information included in the entire image is hard to see when the display 10 displays the entire image. The display 10 may display the entire image while deleting some of the pieces of information (for example, text information) included in the entire image. In such a situation, however, a piece of information needed by a user may also be deleted.

The display control device 100 according to the present embodiment changes partial images of the entire image based on a user's operation. The user performs a "tool display operation" on the touch panel 20 while the display 10 is displaying a partial image of the entire image. Typically, the user performs the "tool display operation" on the touch panel 20 with a finger thereof. The "tool display operation" refers to an operation for causing the display 10 to display a move operation tool T. The "tool display operation" is for example a two-point touch operation. Alternatively, the "tool display operation" may be a tap operation. The tap operation is for example a single tap operation or a double tap operation. Alternatively, the "tool display operation" may be a pinch-out operation.

In FIG. 2, the user performs the tool display operation by touching two points on the touch panel 20 with a forefinger and a thumb of one of the two hands.

Upon the user performing the tool display operation on the touch panel 20, the touch panel 20 detects the user's tool display operation. Upon the touch panel 20 detecting the user's tool display operation, the display 10 displays the move operation tool T. In such a situation, the display controller 30 controls the display 10 to display the move operation tool T based on the user's tool display operation.

The move operation tool T indicates the position of the image being displayed by the display 10 out of the entire image, which is a display target. The move operation tool T is for example a scroll bar.

When the display 10 displays the move operation tool T, the user performs a move operation on the touch panel 20 through operation of the move operation tool T. Typically, the user performs the move operation on the touch panel 20 with a finger thereof. The touch panel 20 detects the user's move operation. The display controller 30 controls the display 10 to display, out of the entire image, a different image from the image being displayed by the display 10 based on the user's move operation.

The move operation tool T that is displayed by the display 10 is preferably sized to facilitate the user to perform an operation. Preferably, the move operation tool T for example has a length of at least 3 cm. More preferably, the move operation tool T for example has a length of at least 5 cm and no less than 15 cm.

The user for example performs a long touch (long press) on the touch panel 20 as the tool display operation. In such a situation, the display controller 30 controls the display 10 to display the move operation tool T. The display controller 30 for example determines that the tool display operation is performed when a touch operation continues for 0.5 seconds or longer. The display controller 30 may control the display 10 to display, out of the entire image, a different image from the image being displayed by the display 10 upon the move operation being performed while the tool display operation is being performed on the touch panel 20.

The move operation tool T in the display control device 100 may be displayed at a position corresponding to the user's tool display operation on the touch panel 20. For example, upon the user performing the tool display operation, the display 10 displays the move operation tool T in the vicinity of the position at which the tool display operation has been performed without substantially changing the image being displayed.

The length of the move operation tool T may change depending on a distance between two points of the user's touch performed as the tool display operation. In such a configuration, the user can adjust the length of the move operation tool T easily, and thus the user can move the image being displayed out of the entire image with desired precision.

The display 10 of the display control device 100 according to the present embodiment displays the move operation tool T based on a user's tool display operation. Thus, the user can readily move an image being displayed by the display 10 out of the entire image using the move operation tool T while preventing unintended image move.

Again, the display 10 of the display control device 100 according to the present embodiment displays the move operation tool T based on a user's tool display operation. Thus, the display 10 can move the image appropriately without the need to display a tool for a move operation before the user performs the tool display operation. Furthermore, since the move operation tool T can be displayed at a desired position as appropriate, the display 10 can move the image readily even if some tool for a move operation is displayed in advance.

In a situation in which the user performs the tool display operation using the left hand as illustrated in FIG. 2, the move operation tool T is preferably displayed at the right side of the position of the tool display operation. As a result of the move operation tool T being displayed at the right side of the position of the tool display operation, the user can easily perform a move operation using the right hand.

Figure 3:
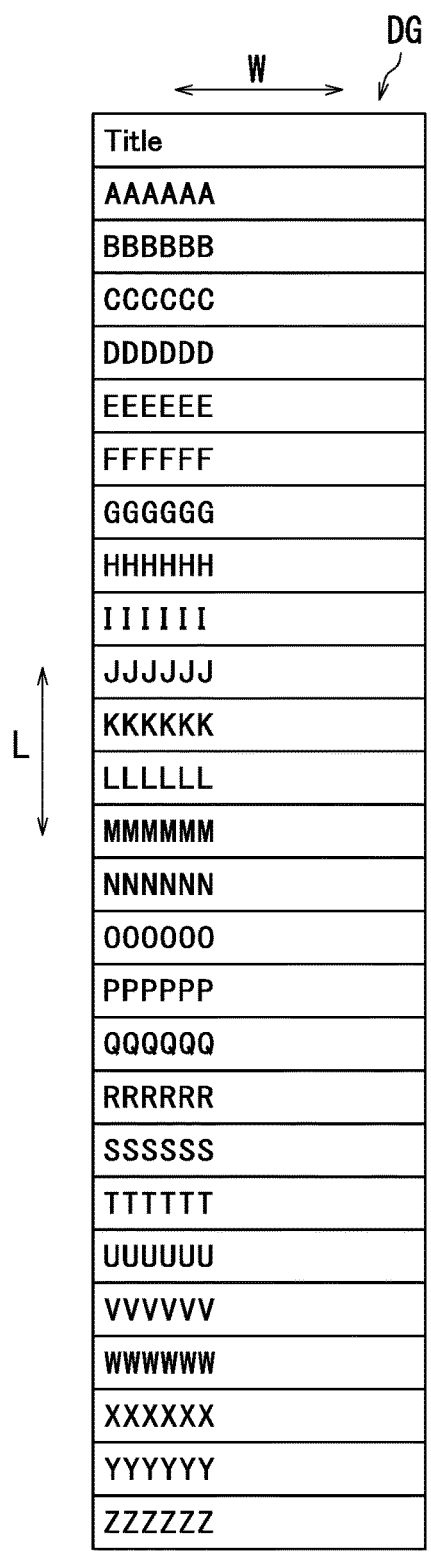
FIG. 3 is a schematic diagram illustrating an entire image, which is a display target in the display control device according to the embodiment of the present disclosure.

FIG. 3 is a schematic diagram illustrating an entire image DG, which is a display target in the display control device 100 according to the present embodiment. The entire image DG has a width along a left-right direction W and a length along an up-down direction L.

Typically, the entire image DG is stored in the storage section 40 illustrated in FIG. 1. The display controller 30 can control the display 10 such that the display 10 displays the entire image DG as illustrated in FIG. 3 as necessary. However, in a situation in which the display 10 displays the entire image DG, characters in the image being displayed may be so small that detailed information is unreadable to the user.

In the present description, the entire image DG includes list information. The list information has a plurality of elements arranged one above the other, that is, arranged in the up-down direction L. The list information is about an item, that is, title. The elements in the list information are titles different from one another. In the present description, the first line of the list information is a name of the item "Title". The second line of the list information is "AAAAAA". The third line of the list information is "BBBBBB".

Figure 4A:
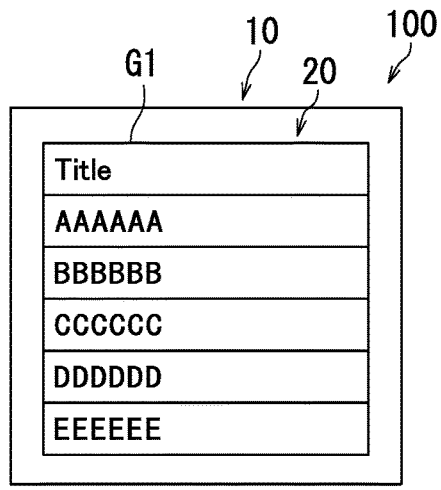
FIGS. 4A to 4E are schematic diagrams illustrating operation of the display control device according to the embodiment of the present disclosure.
Figure 4B:
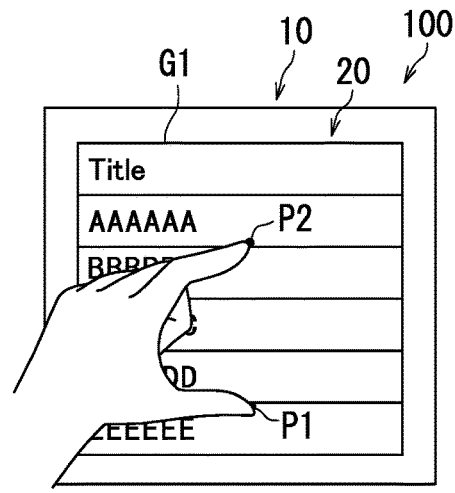
Figure 4C:
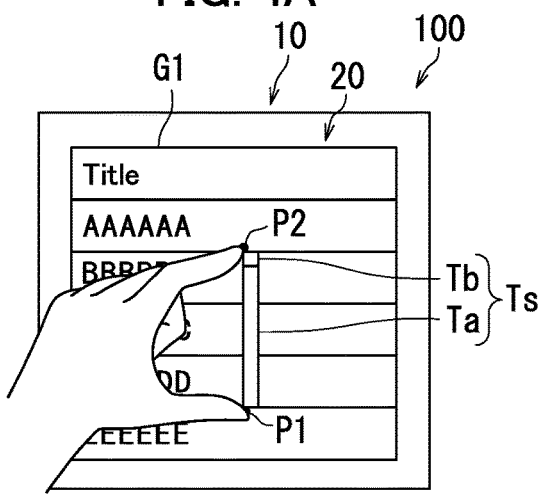
Figure 4D:
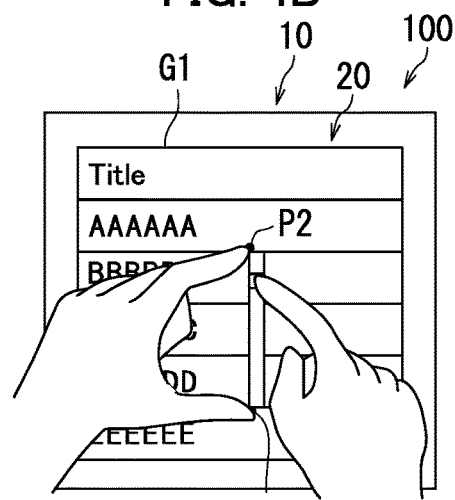
Figure 4E:
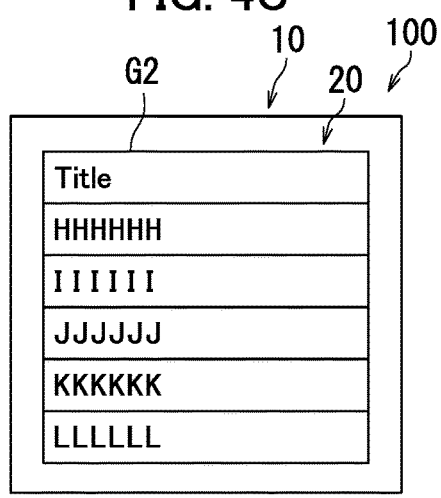

The following describes operation of the display control device 100 according to the present embodiment with reference to FIGS. 1, 3, and 4A to 4E. FIG. 4A is a schematic diagram illustrating the display control device 100 before the tool display operation is performed. FIG. 4B is a schematic diagram illustrating the tool display operation that is performed on the touch panel 20. FIG. 4C is a schematic diagram illustrating the display control device 100 after the tool display operation. FIG. 4D is a schematic diagram illustrating a move operation that is performed on the touch panel 20. FIG. 4E is a schematic diagram illustrating the display control device 100 after the move operation.

As illustrated in FIG. 4A, the display 10 is displaying an image G1 on the screen. The image G1 is a partial image of the entire image DG illustrated in FIG. 3. The display 10 is displaying only the image G1 and is not displaying the rest of the entire image DG.

The display controller 30 controls the display 10 such that the display 10 displays the image G1 as illustrated in FIG. 4A. Typically, the entire image DG is stored in the storage section 40 illustrated in FIG. 1. The display controller 30 controls the display 10 to display the image G1 based on the information stored in the storage section 40. The display 10 displays the move operation tool T upon the following tool display operation as described below. However, at this time, that is, before the tool display operation is performed, the display 10 does not display the move operation tool T.

Next, the user performs the tool display operation on the touch panel 20 as illustrated in FIG. 4B. Typically, the user performs the tool display operation on the touch panel 20 with two fingers of one of the two hands. In such a situation, the touch panel 20 detects the user's tool display operation.

In the present description, the user touches the touch panel 20 with the thumb and the forefinger of the left hand. In FIG. 4B, a point P1 on the touch panel 20 represents a position of the touch performed by the thumb of the left hand of the user, and a point P2 represents a position of the touch performed by the forefinger of the left hand of the user. The point P2 is located upward of the point P1. The points P1 and P2 on the touch panel 20 are separated substantially along the up-down direction of the touch panel 20. The touch panel 20 detects the position of the two points of the touch performed as the tool display operation.

Upon the touch panel 20 detecting the tool display operation, the display 10 displays a scroll bar Ts as the move operation tool T on the image G1 as illustrated in FIG. 4C. In such a situation, the display controller 30 controls the display 10 to display the scroll bar Ts. The scroll bar Ts is a software key for receiving an instruction to move the image being displayed by the display 10 out of the entire image DG.

The scroll bar Ts includes a scroll zone Ta and a knob Tb. The scroll zone Ta is elongated in the up-down direction. A lower end of the scroll zone Ta is located in the vicinity of the point P1 of the touch performed as the tool display operation. An upper end of the scroll zone Ta is located in the vicinity of the point P2 of the touch performed as the tool display operation. Thus, the scroll zone Ta extends from the vicinity of the point P1 of the touch performed as the tool display operation to the vicinity of the point P2 of the touch performed as the tool display operation. In the present description, the scroll zone Ta has a length substantially equal to the distance between the point P1 and the point P2 of the touch performed as the tool display operation.

The knob Tb is movable within the scroll zone Ta in the up-down direction. The scroll zone Ta represents the overall length of the entire DG, and the knob Tb represents the position of the image G1 being currently displayed by the display 10 out of the entire image DG. In the present description, the knob Tb is located at an upper end of the scroll zone Ta. The scroll bar Ts is preferably displayed at the right side of the points P1 and P2 of the touch performed as the tool display operation as illustrated in FIG. 4C.

Thereafter, the user performs a move operation on the touch panel 20 as illustrated in FIG. 4D with the scroll bar Ts being displayed by the display 10. In the present description, the user slides the forefinger of the right hand downward while touching the knob Tb with the forefinger as the move operation. The display controller 30 determines that the touch panel 20 has detected the move operation performed on a region of the touch panel 20 corresponding to the move operation tool T displayed by the display 10.

Upon the move operation, the display 10 displays another image as illustrated in FIG. 4E. The image displayed by the display 10 changes from the image G1 displayed before the tool display operation to a different image G2. Both the images G1 and G2 are partial images of the entire image DG. In such a situation, upon determining that the touch panel 20 has detected the user's move operation, the display controller 30 controls the display 10 to change the image being displayed by the display 10 from the image G1 to the image G2 based on the move operation.

In FIG. 4B, the user touches two points separated in the up-down direction on the touch panel 20. However, the two points of the users touch do not need to be separated in the up-down direction on the display 10. The user's operation may be in an oblique direction. In such a situation, the touch panel 20 may detect the two points of the user's touch separated in the oblique direction as two points of the user's touch separated in the up-down direction so long as a component having a projection in the up-down direction is greater than a component having a projection in the left-right direction, among oblique components of the user's touch.

In the description given above with reference to FIGS. 1, 2, and 4A to 4E, a user performs the tool display operation with the left hand and performs the move operation with the right hand. However, the present disclosure is not limited to such description. The user may perform the tool display operation with the right hand and perform the move operation with the left hand.

Figure 5:
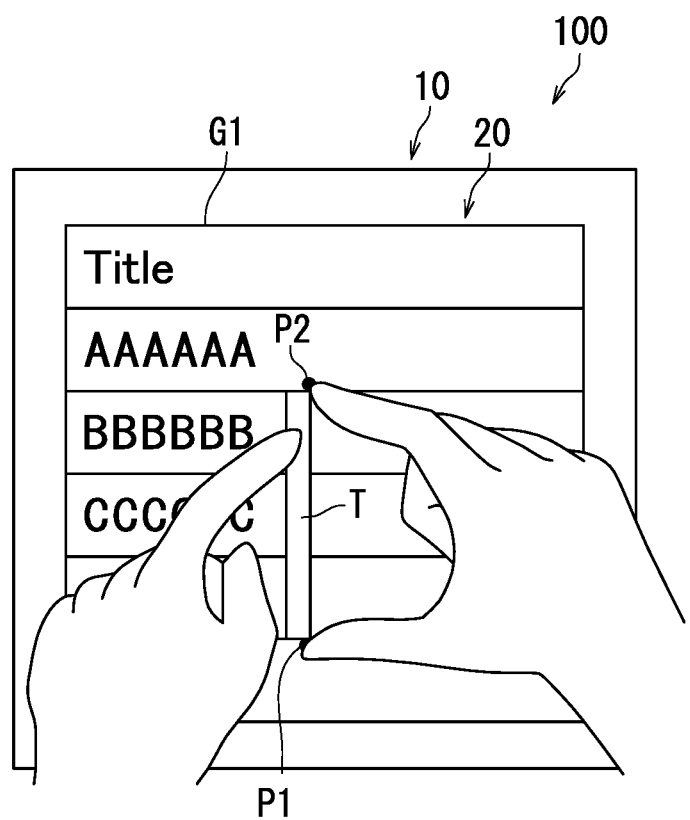
FIG. 5 is a schematic diagram illustrating operation of the display control device according to the embodiment of the present disclosure.

The following describes operation of the display control device 100 according to the present embodiment with reference to FIGS. 1 and 5. FIG. 5 is a schematic diagram illustrating operation of the display control device 100 according to the present embodiment.

As described above, a user performs the tool display operation on the touch panel 20 with the right hand as illustrated in FIG. 5 when the display 10 displays the image G1. In the present description, the user touches the touch panel 20 with the thumb and the forefinger of the right hand. In such a situation, the touch panel 20 detects two points of the touch.

Next, based on the tool display operation performed on the touch panel 20, the display 10 displays the move operation tool T as illustrated in FIG. 5. In such a situation, the move operation tool T is preferably displayed at the left side of the points P1 and P2 of the touch performed as the tool display operation as illustrated in FIG. 5.

As described above, upon the touch panel 20 detecting the tool display operation, the display controller 30 controls the display 10 to display the move operation tool T in the vicinity of the points P1 and P2 at which the tool display operation has been performed without substantially changing the image G1.

Figure 6A:
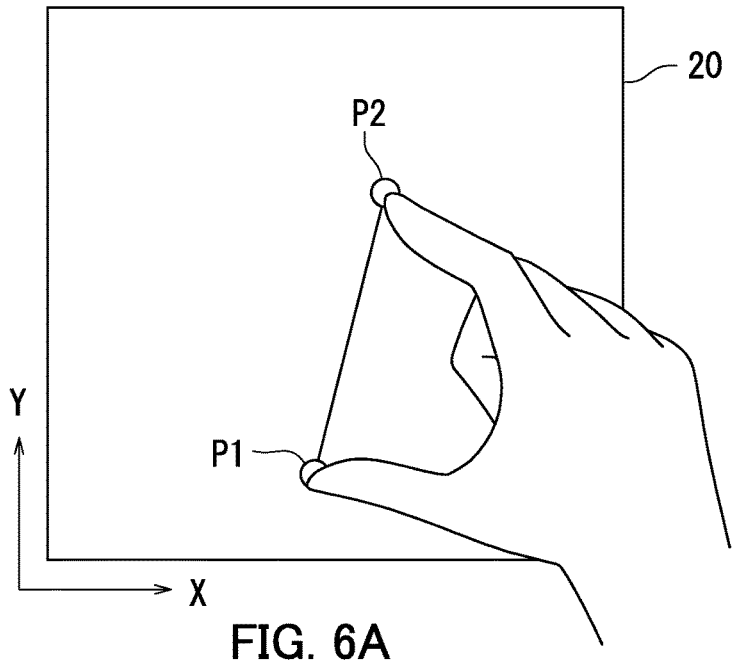
FIGS. 6A to 6C are schematic diagrams illustrating operation of the display control device according to the embodiment of the present disclosure.
Figure 6B:
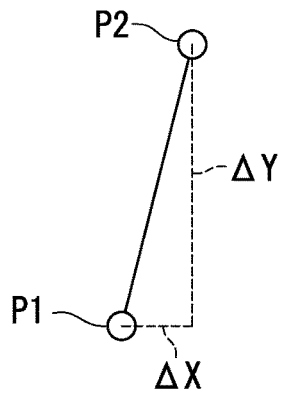
Figure 6C:
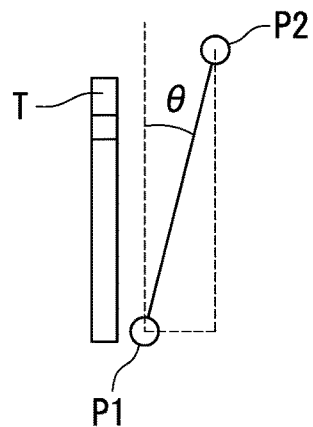

The following describes operation of the display control device 100 according to the present embodiment with reference to FIGS. 1 and 6A to 6C. FIGS. 6A to 6C are schematic diagrams illustrating operation of the display control device 100 according to the present embodiment. FIG. 6A is a schematic diagram illustrating the tool display operation that is performed on the touch panel 20. FIG. 6B is a schematic diagram illustrating a result of detection by the touch panel 20. FIG. 6C is a schematic diagram illustrating the move operation tool T displayed by the display 10.

As illustrated in FIG. 6A, a user touches the touch panel 20 as the tool display operation. In the present description, the user touches the point P1 on the touch panel 20 with the thumb of the right hand and touches the point P2 on the touch panel 20 with the forefinger of the right hand. An X axis is defined as the left-right direction, and a Y axis is defined as the up-down direction.

In such a situation, the touch panel 20 detects the points P1 and P2 as illustrated in FIG. 6B. Coordinates of the point P1 are (X1, Y1), and coordinates of the point P2 are (X2, Y2). A distance $\Delta X$ between the points P1 and P2 in the left-right direction is represented by (X2-X1). A distance $\Delta Y$ between the points P1 and P2 in the up-down direction is represented by (Y2-Y1).

A slope $\theta$ of a straight line connecting the point P1 and the point P2 relative to a straight line along the up-down direction is represented by $\tan^{-1}(\Delta X/\Delta Y)$ as illustrated in FIG. 6C. In a situation in which the slope $\theta$ is 0° or greater and 90° or less, the display controller 30 determines that the tool display operation has been performed by the user's right hand. Accordingly, the display controller 30 controls the display 10 to display the move operation tool T at the left side of the points P1 and P2. In a situation in which the slope $\theta$ is −90° or greater and less than 0°, the display controller 30 determines that the tool display operation has been performed by the user's left hand. Accordingly, the display controller 30 controls the display 10 to display the move operation tool T at the right side of the points P1 and P2.

In a situation in which $\Delta X$ is greater than $\Delta Y$ in the user's two-point touch performed on the touch panel 20, the display controller 30 does not need to determine the user's operation as the tool display operation.

In the description given above, the display 10 is capable of displaying the entire image DG in the left-right direction and is capable of displaying only a partial image of the entire image DG in the up-down direction. However, the present disclosure is not limited to such description. The display 10 may be capable of displaying the entire image DG in the up-down direction and may be capable of displaying only a partial image of the entire image DG in the left-right direction. Alternatively, the display 10 may be capable of displaying only a partial image of the entire image DG both in the left-right direction and in the up-down direction. In a configuration in which the display 10 is capable of displaying only a partial image of the entire image DG in the left-right direction, for example, the move operation tool T elongated in the left-right direction is preferably displayed so that the image being displayed by the display 10 is movable in the left-right direction.

In the description given above with reference to FIGS. 4A to 4E, the scroll bar Ts is used as the move operation tool T. However, the move operation tool T according to the present disclosure is not limited to a scroll bar Ts. The move operation tool T may take another form. For example, an index bar may be used as the move operation tool T.

Figure 7:
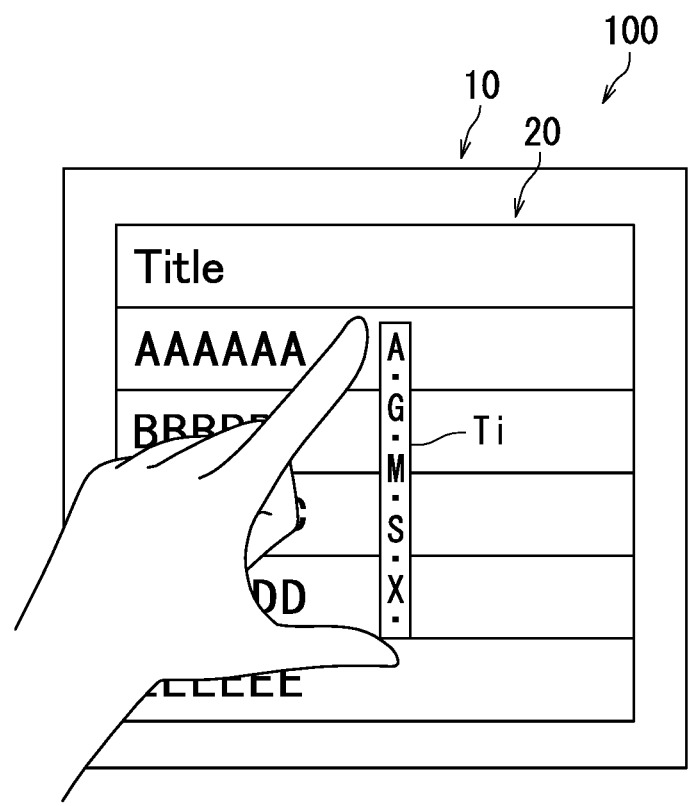
FIG. 7 is a schematic diagram illustrating operation of the display control device according to the embodiment of the present disclosure.

The following describes operation of the display control device 100 according to the present embodiment with reference to FIG. 7. FIG. 7 is a schematic diagram of the display control device 100. Upon the tool display operation being performed on the touch panel 20 in the display control device 100, the display 10 displays an index bar Ti as the move operation tool T. In the present description, the index bar Ti has letters "A", "G", "M", "S", and "X".

Upon a user touching the letter "G" of the index bar Ti as the move operation, for example, the image being displayed by the display 10 is changed to an image having a name "GGGGGG" at an upper location therein. Upon a user touching a midpoint between the letters "G" and "M" of the index bar Ti as the move operation, for example, the image being displayed by the display 10 is changed to an image having a name "JJJJJJ" at an upper location therein.

In the description given with reference to FIG. 7, the image includes alphabetical letters, and the information displayed in the index bar Ti has alphabetical letters. However, the present disclosure is not limited to such description. The information displayed in the index bar Ti is preferably changed depending on the image. For example, the information displayed in the index bar Ti may be hiragana in Japanese or numbers.

For example, in a situation in which the display target of the display 10 is document information created by a personal computer, the information displayed in the index bar Ti may be information indicating dates on which the document information was created. For another example, in a situation in which the display target of the display 10 is photographs taken using a digital camera or a smartphone, the information displayed in the index bar Ti may be information indicating dates on which the photographs were taken. Alternatively, the information displayed in the index bar Ti may be icons.

As described above, the storage section 40 illustrated in FIG. 1 may store therein a program for controlling operation of the display controller 30. The storage section 40 in the display control device 100 according to the present embodiment may store therein a computer program for controlling displaying by the display 10 based on a user's operation.

The display controller 30 (computer) may control the display 10 as described below. (1) The display 10 displays a partial image of an entire image. (2) The display controller 30 determines whether or not the touch panel 20 has detected a tool display operation. (3) Upon determination that the touch panel 20 has detected the tool display operation, the display 10 displays the move operation tool T. (4) The display controller 30 determines whether or not the touch panel 20 has detected a move operation performed through operation of the move operation tool T. (5) Upon determination that the touch panel 20 has detected the move operation performed through operation of the move operation tool T, the display 10 displays a different partial image from the image being displayed by the display 10 out of the entire image.

Figure 8:
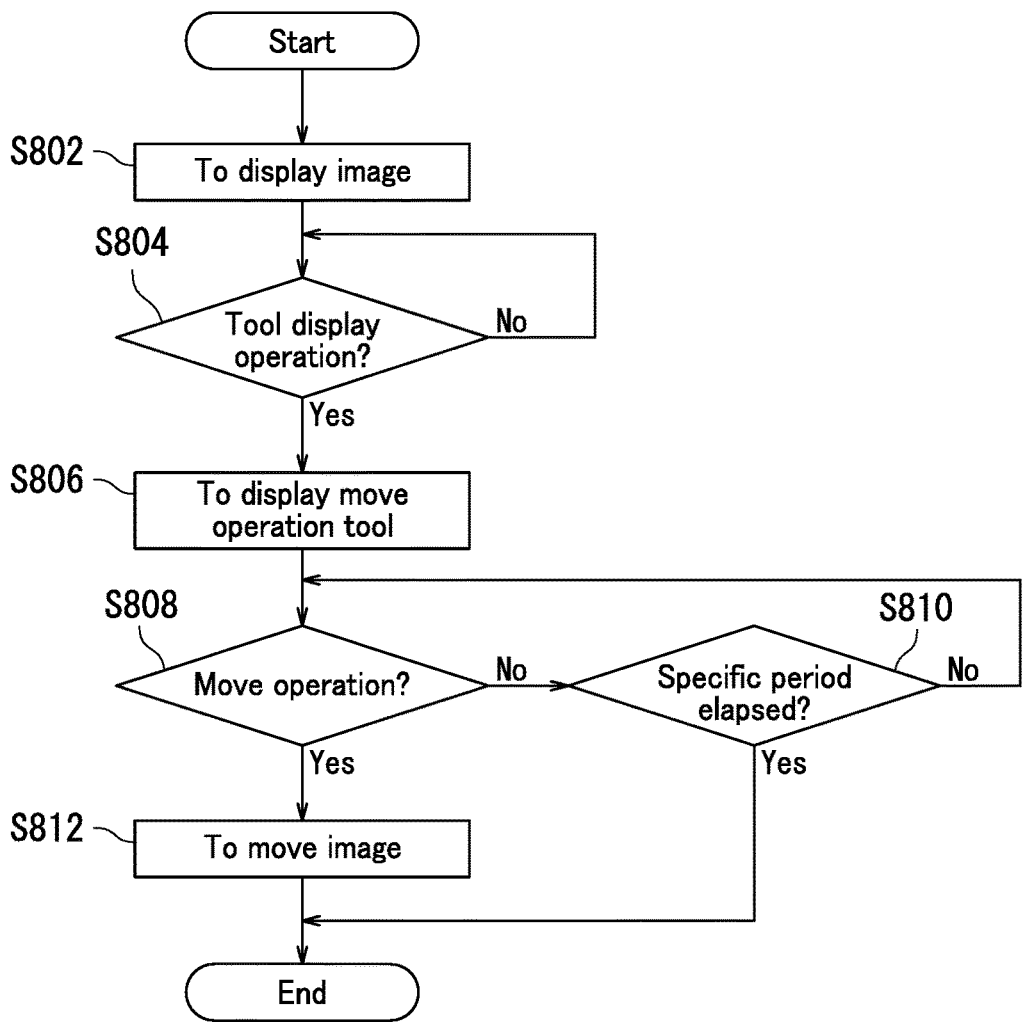
FIG. 8 is a flowchart illustrating steps to be performed through a program according to the embodiment of the present disclosure.

The following describes a flowchart illustrating steps to be performed through a program according to the present embodiment with reference to FIGS. 1 and 8. FIG. 8 is a flowchart illustrating steps to be performed through the program according to the present embodiment. The display controller 30 may perform a process illustrated in FIG. 8 through reading the stored program.

In step S802, the display controller 30 controls the display 10 to display an image. For example, the display controller 30 controls the display 10 to display an image based on a user's operation through the touch panel 20.

Next, in Step S804, the display controller 30 determines whether or not the touch panel 20 has detected the tool display operation. If the display controller 30 determines that the touch panel 20 has not detected the tool display operation (No in Step S804), the display controller 30 re-determines in Step S804 whether or not the touch panel 20 has detected the tool display operation.

If the display controller 30 determines that the touch panel 20 has detected the tool display operation (Yes in Step S804), the display controller 30 controls the display 10 to display the move operation tool T in Step S806.

Next, in Step S808, the display controller 30 determines whether or not the touch panel 20 has detected the move operation. If the display controller 30 determines that the touch panel 20 has not detected the move operation (No in Step S808), the display controller 30 determines in Step S810 whether or not a specific period of time has elapsed after the display 10 had displayed the move operation tool T.

If the specific period of time has not elapsed after the display 10 had displayed the move operation tool T (No in Step S810), the display controller 30 re-determines in Step S808 whether or not the touch panel 20 has detected the move operation.

If the specific period of time has elapsed after the display 10 had displayed the move operation tool T (Yes in Step S810), the display controller 30 ends the process without changing the image being displayed by the display 10.

If the display controller 30 determines that the touch panel 20 has detected the move operation (Yes in Step S808), the display controller 30 controls the display 10 to change the image being displayed by the display 10 out of the entire image based on the move operation in Step S812.

In the description given above, the user performs operations using fingers. However, the present disclosure is not limited to such description. User's operations may be performed on the touch panel 20 using a dedicated stick or any stick so long as the operations can be detected by the touch panel 20.

In the description given above with reference to the drawings, displaying and changing images on the entire screen of the display 10 are discussed. However, the present disclosure is not limited to such description. The present disclosure may be applied to displaying and changing images in one window within the screen.

In the description given above, the two-point touch is discussed as an example of the tool display operation. However, the present disclosure is not limited to such description. The tool display operation may be a tap operation or a pinch-out operation. In a configuration in which the tool display operation is a tap operation, the tap operation is preferably a double tap operation that is performed by tapping two points on the touch panel 20.

Furthermore, no particular limitations are placed on the form of the display control device 100 according to the present embodiment. The display control device 100 may be used as a part of a smartphone or a tablet computer. Alternatively, the display control device 100 may be used as a part of a CD player, a DVD player, and any of various electronic devices. For example, the display control device 100 may be used as a part of an image forming apparatus. More specifically, the image forming apparatus including the display control device 100 may be multifunctional, having either or both of a scanner function and a facsimile machine function as well as a printer function or a copier function.

What is claimed is:

1. A display control device, comprising:
a display;
a touch panel attached to the display; and
a display controller having a processor and a storage section storing therein a control program, wherein
through the processor executing the control program, the display controller controls the display based on an operation performed on the touch panel,
the display controller determines whether or not the touch panel has detected a tool display operation performed when the display displays a partial image of an entire image,
upon determining that the touch panel has detected the tool display operation, the display controller controls the display to display a move operation tool, the display controller determines whether or not the touch panel has detected a move operation performed through operation of the move operation tool, upon determining that the touch panel has detected the move operation performed through operation of the move operation tool, the display controller controls the display to display a different partial image of the entire image based on the move operation, the touch panel detects positions of two points on the touch panel at which an operation is performed as the tool display operation, the display displays the move operation tool in the vicinity of the positions at which the tool display operation has been performed without substantially changing the image being displayed, and a lower end of the move operation tool is located in the vicinity of a lower one of the two points and an upper end of the move operation tool is located in the vicinity of an upper one of the two points.

2. The display control device according to claim 1, wherein
the display controller controls the display to display a scroll bar as the move operation tool.

3. The display control device according to claim 1, wherein
the tool display operation is a long touch performed on the touch panel.

4. The display control device according to claim 1, wherein
the display controller controls the display to change a length of the move operation tool depending on a distance between the two points.

5. The display control device according to claim 1, wherein
the display controller controls the display to change a position of the move operation tool relative to the positions of the two points at which the operation is performed, depending on a slope of a straight line connecting the two points.

6. The display control device according to claim 1, wherein
the display controller determines whether the tool display operation has been performed with a right hand of a user or with a left hand of the user based on a clockwise slope of a straight line connecting the two points relative to an up-down direction on the display.

7. The display control device according to claim 6, wherein
the display controller determines that the tool display operation has been performed with the right hand of the user in a situation in which the slope is 0° or greater and 90° or less and determines that the tool display operation has been performed with the left hand of the user in a situation in which the slope is −90° or greater and less than 0°.

8. The display control device according to claim 1, wherein
upon a user performing the tool display operation with a left hand, the display controller controls the display to display the move operation tool at a right side of a position of the tool display operation.

9. The display control device according to claim 1, wherein
upon a user performing the tool display operation with a right hand, the display controller controls the display to display the move operation tool at a left side of a position of the tool display operation.

10. The display control device according to claim 1, wherein
the display controller controls the display to display an index bar as the move operation tool.

11. The display control device according to claim 10, wherein
in a situation in which a display target of the display is photographs, the display controller controls the display to display, in the index bar, information indicating dates on which the photographs were taken.

12. A non-transitory computer-readable storage medium having a program recorded thereon, the program being configured to cause a computer to perform:

controlling a display to display a partial image of an entire image;

determining whether or not a touch panel attached to the display has detected a tool display operation;

controlling, upon determining that the touch panel has detected the tool display operation, the display to display a move operation tool based on the tool display operation;

inputting, through the touch panel detecting positions of two points on the touch panel at which an operation is performed as the tool display operation, the two positions;

controlling the display to display the move operation tool in the vicinity of the positions at which the tool display operation has been performed without substantially changing the image being displayed;

controlling the display to display a lower end of the move operation tool in the vicinity of a lower one of the two points and display an upper end of the move operation tool in the vicinity of an upper one of the two points;

determining whether or not the touch panel has detected a move operation performed through operation of the move operation tool; and controlling, upon determining that the touch panel has detected the move operation, the display to display a different partial image of the entire image based on the move operation.

* * * * *